UNITED STATES PATENT OFFICE.

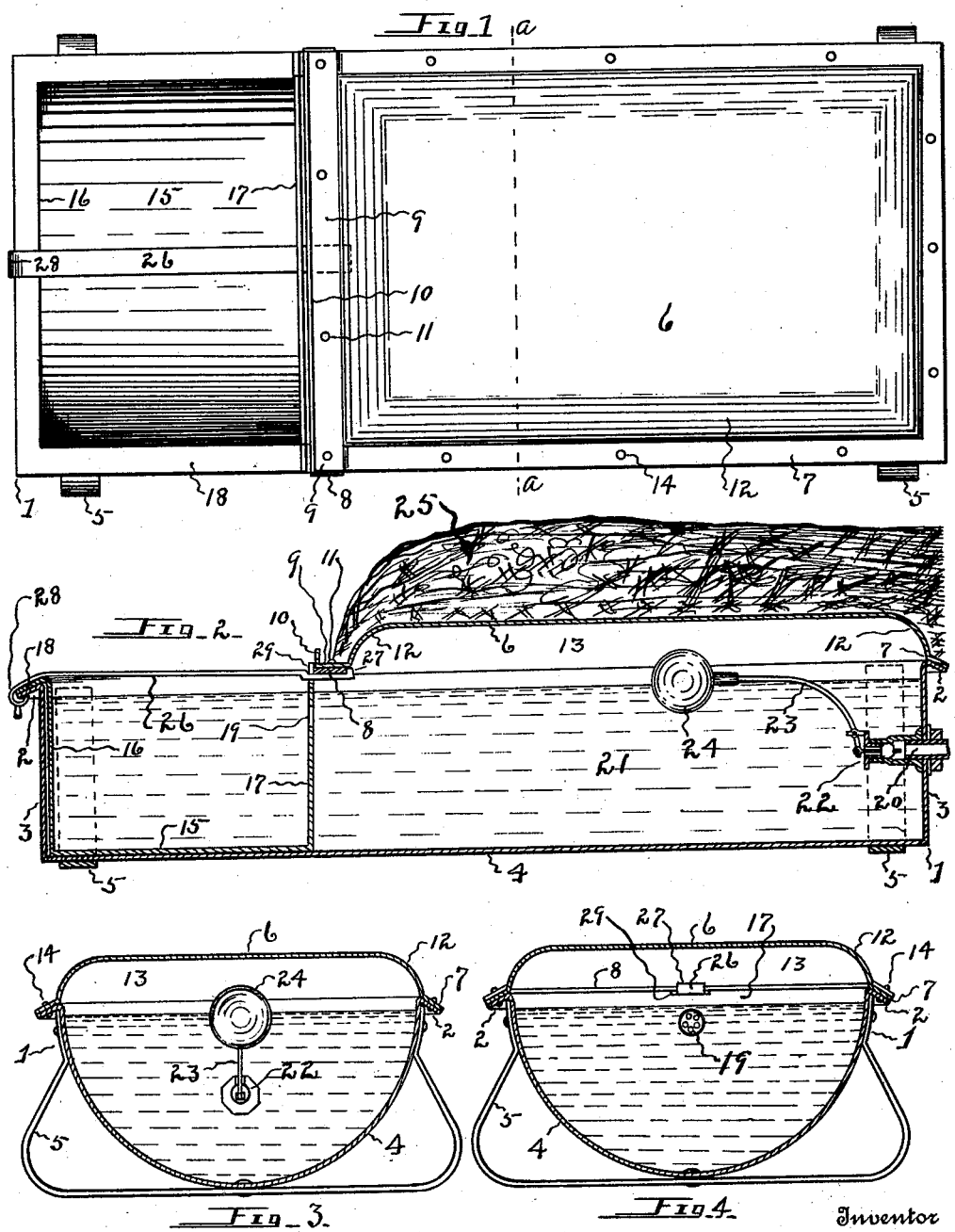

ALBERT N. EATON, OF OMAHA, NEBRASKA.

FOUNTAIN-TANK.

1,028,998.  Specification of Letters Patent.  Patented June 11, 1912.

Application filed March 17, 1911. Serial No. 615,029.

*To all whom it may concern:*

Be it known that I, ALBERT N. EATON, a citizen of the United States, residing at Omaha, in the county of Douglas and State of Nebraska, have invented certain new and useful Improvements in Fountain-Tanks, of which the following is a specification.

This invention relates to improvements in fountain tanks of the class employing float valves to automatically provide a uniform quantity of water for the use of poultry or stock, a conducting pipe being employed to connect the tank with a source of water supply.

The object of the invention is to provide a watering tank of sheet metal, so constructed that it may be disposed to advantage horizontally for the purpose of covering a part of it with earth, straw, compost or manure to prevent freezing of the water.

The invention has reference to the employment of certain integral parts, the number of these parts being as few as possible, so that the tank may be constructed economically, and includes certain features relating to a drainage for the material used as a covering.

With these and other objects in view, as will be more particularly mentioned, the invention presents a novel construction, combination and arrangement of parts as herein described and claimed, and as illustrated in the drawing wherein,—

Figure 1 is a plan view of the tank. Fig. 2 is a view thereof in longitudinal section, a covering being also shown. Fig. 3 is a transverse section on line *a a* of Fig. 1, looking to the rear, and Fig. 4 is a similar view to that shown in Fig. 3, looking to the front end of the tank.

Referring now to the drawing, for a more particular description, numeral 1 indicates an elongated container, rectangular receptacle or tank which may be constructed to advantage of sheet metal, the upper parts of its walls near their edges being provided with flat outwardly-projecting downwardly inclined flanges 2; the tank, preferably, has vertical ends 3, its bottom 4 being concaved in form, and it may be supported upon suitable transverse braces 5 secured upon its bottom and sides, near its ends.

At 6 is indicated a casing, hood or cover having a length less than the length of the tank, said hood at its sides and rear end, near its edges being provided with flanges 7, formed flat, and projecting-outwardly and inclined downwardly for a seating upon flanges 2.

At 8 is indicated a supporting bar disposed transversely upon receptacle 1, near its front end.

The front end of the hood is provided with the horizontal flange 9 with an upset terminal 10, these parts forming a transverse trough or valley at the front of the hood; flange 9 is supported upon bar 8 and may be secured thereto by rivets 11. The hood is formed, near its edges, with upwardly projecting or outwardly curved walls 12 between flanges 7 and the body of the hood. The hood therefore provides an air chamber 13 disposed above receptacle 1. Suitable keepers or rivets 14 may be used for connecting flanges 2 and 7, to secure the hood upon receptacle 1.

At 15 is indicated a drinking pan or receptacle, its sides and bottom conforming substantially to the curvature of the sides and bottom of receptacle 1, its front and rear ends being respectively indicated at 16 and 17. The drinking pan has a length substantially equal to the distance between the supporting bar 8 and the front end wall of receptacle 1, and preferably its edges at its sides and front end are downturned to provide the flange 18 adapted to be disposed upon the adjacent flanges of the tank to prevent impurities from passing therein. I do not limit myself to the use of flange 18, however, and if the drinking pan is constructed of a proper size to fill the space between bar 8 and the adjacent end of receptacle 1, flange 18 may be dispensed with. The rear end of the drinking pan is provided with the intake port 19, near its upper edge. Since this intake is near the upper terminal of the pan, any sand, gravel or other objectionable material which may enter the tank, may not pass into said pan.

At 20 is indicated a water supply pipe projecting within the containing chamber 21 of the tank, and upon the inner end of this pipe may be mounted any suitable float-valve 22, the arm and float thereof being respectively indicated at 23 and 24.

In order to prevent freezing of the water, the tank may be covered with any suitable non-conducting substance 25, as straw or manure, and this material should be disposed upon the hood, and against the sides and rear end of the tank, that part of the tank containing the drinking receptacle remaining exposed. Wall 17 of the pan has an adequate height so that its upper part may bear against supporting bar 8 to prevent a sliding movement of the pan longitudinally of receptacle 1. The article provides a very useful drinking fountain for stock, the float-valve operating automatically to provide a uniform supply of water within the tank, the water passing within the drinking pan or receptacle through intake port 19.

On account of the construction of the hood and inclined flanges 2 and 7, these parts operate as a water shed to prevent impurities from passing within this part of the tank; and the trough or valley formed by flanges 9 and 10 tends to prevent the passage or drainage of impurities from the material 25 to the drinking receptacle; and the supports or braces 5 tend to sustain the tank in an upright position.

In operation, when the water in the drinking pan is removed or reduced to a point below intake 19 the buoyancy of this receptacle would tend to elevate or raise it from the tank, and this may be prevented by any suitable means, the means herein shown being the strap or detent bar 26, disposed longitudinally of the tank between the sides of the receptacle, the angular terminal 27 of its rear end engaging cross-bar 8, its front end being curved to form the spring-hook 28 for engagement with flange 2 of the tank, a suitable recess 29 being formed in wall 17 of the drinking pan, opening upon its upper edge, within which the strap 26 may be seated.

As thus described the water within the tank may be kept practically free from impurities which might be occasioned by the material used for its covering; and in practice, the entire tank may be covered with the material except the part which contains the drinking pan.

The pan may be readily removed for the purpose of cleaning it, or for cleaning the tank, hook 28 being raised from its engagement with the flanges, and strap 26 being then removed for this purpose. On account of the construction of the hood it will sustain a considerable weight, and this is desirable for obvious reasons.

The tank may be manufactured economically. It is durable in use; and since a considerable volume of water and air is protected from the cold by the covering mentioned, freezing of water in the exposed parts of the tank is generally prevented.

Having fully described my invention, what I claim and desire to secure by Letters Patent is,—

1. A fountain tank comprising a body portion having downwardly and outwardly directed flanges extending entirely around its upper edge, a transverse bar extending across said body portion, a hood covering only a portion of said body, said hood having terminal downwardly inclined flanges bearing upon the flanges of the body portion at the rear of and at each side of the body portion, the forward edge of said hood terminating in a flat valley portion and an upstanding lip, said valley portion resting upon and being secured to said transverse bar and said lip and valley portion extending transversely of the body portion, a drinking pan seated in that part of the body portion that is not covered by the hood, means for supplying water to the body portion, and a detent bar one end of which has frictional engagement over the front terminal flange of the body portion and the other end of which passes over the rear wall of the drinking pan and under the transverse bar, as and for the purposes set forth.

2. A fountain tank, comprising, in combination with an elongated, rectangular container having an open top with a terminal flange; a supply pipe traversing one of the ends of the container and provided with a valve and a float; a supporting-bar disposed transversely of the container upon said flange; a rectangular drinking-pan having an intake aperture near the upper edge of its containing wall and adapted to be removably disposed within the container with one of its ends engaging the supporting-bar; a strap adapted to be mounted upon the drinking-pan, with one of its ends in engagement with the terminal flange of the elongated container, its opposite end being in engagement with said supporting-bar; and a rectangular hood above the container, said hood being secured near its edges to the supporting-bar and to the flange of the container.

3. A fountain tank, comprising, in combination with an elongated, rectangular container having an open top with a continuous, flat, outwardly-projecting, terminal flange; a supply pipe traversing one of the ends of the container and provided with a valve and a float; a supporting-bar disposed transversely of and between the ends of the container upon said continuous flange; a rectangular drinking-pan having an apertured wall and adapted to be disposed within the container with one of its ends engaging and extending above the supporting-bar; a rectangular hood formed with downwardly-inclined sides and ends and with flat, outwardly-projecting, terminal flanges, one of its terminal end flanges being formed with an upset portion forming a trough extending transversely of the container between said flange and the downwardly-inclined end of the hood.

4. A fountain tank, comprising an elongated receptacle having a transversely curved containing wall with a flat, outwardly-projecting, downwardly-inclined rim; a supporting-bar disposed transversely between the ends of the receptacle and bearing upon said rim; a conducting-pipe extending within the receptacle and provided with a float valve; an elongated hood formed with downwardly-inclined portions at its sides and ends, said side portions and an end portion of the hood having flat, outwardly-projecting, downwardly-inclined flanges, the opposite end portion of the hood being provided with a horizontal flange with an upset terminal to form intermediate the downwardly-inclined end portion of the hood and said upset terminal, a transversely disposed valley; said hood being disposed upon the receptacle, its inclined flanges registering with the inclined terminal rim thereof, its horizontal flange bearing upon said supporting-bar.

5. A fountain tank, comprising a receptacle rectangular in plan and formed with a continuous, flat, outwardly-projecting, downwardly-inclined, terminal flange; a supporting-bar disposed transversely between the ends of the receptacle and bearing upon said flange; a conducting pipe traversing the containing wall of the receptacle and provided with a float valve; a rectangular hood having downwardly-inclined wall portions at its sides and ends with flat, outwardly-projecting flanges, one of the end flanges of said hood being upset to form a barrier plate, and to form between the barrier plate and inclined portion a longitudinal gutter; said hood adapted to have a seating upon the receptacle with its outwardly-projecting flanges at its sides and one of its ends bearing upon the continuous flange of the receptacle, the flange upon its opposite end bearing upon said supporting-bar; a drinking pan removably seated in the receptacle adjacent to said barrier plate, said pan having an intake aperture formed in and near the upper edge of its containing wall; a detent bar mounted upon the receptacle and adapted to overhang a part of the drinking pan, and connected with said supporting-bars; and a plurality of keepers traversing the supporting-bar, the flanges of the hood and the flanges of said receptacle.

In testimony whereof I have affixed my signature in presence of two witnesses.

ALBERT N. EATON.

Witnesses:
HIRAM A. STURGES,
E. L. HUMPHREY.

---

Copies of this patent may be obtained for five cents each, by addressing the "Commissioner of Patents, Washington, D. C."